UNITED STATES PATENT OFFICE.

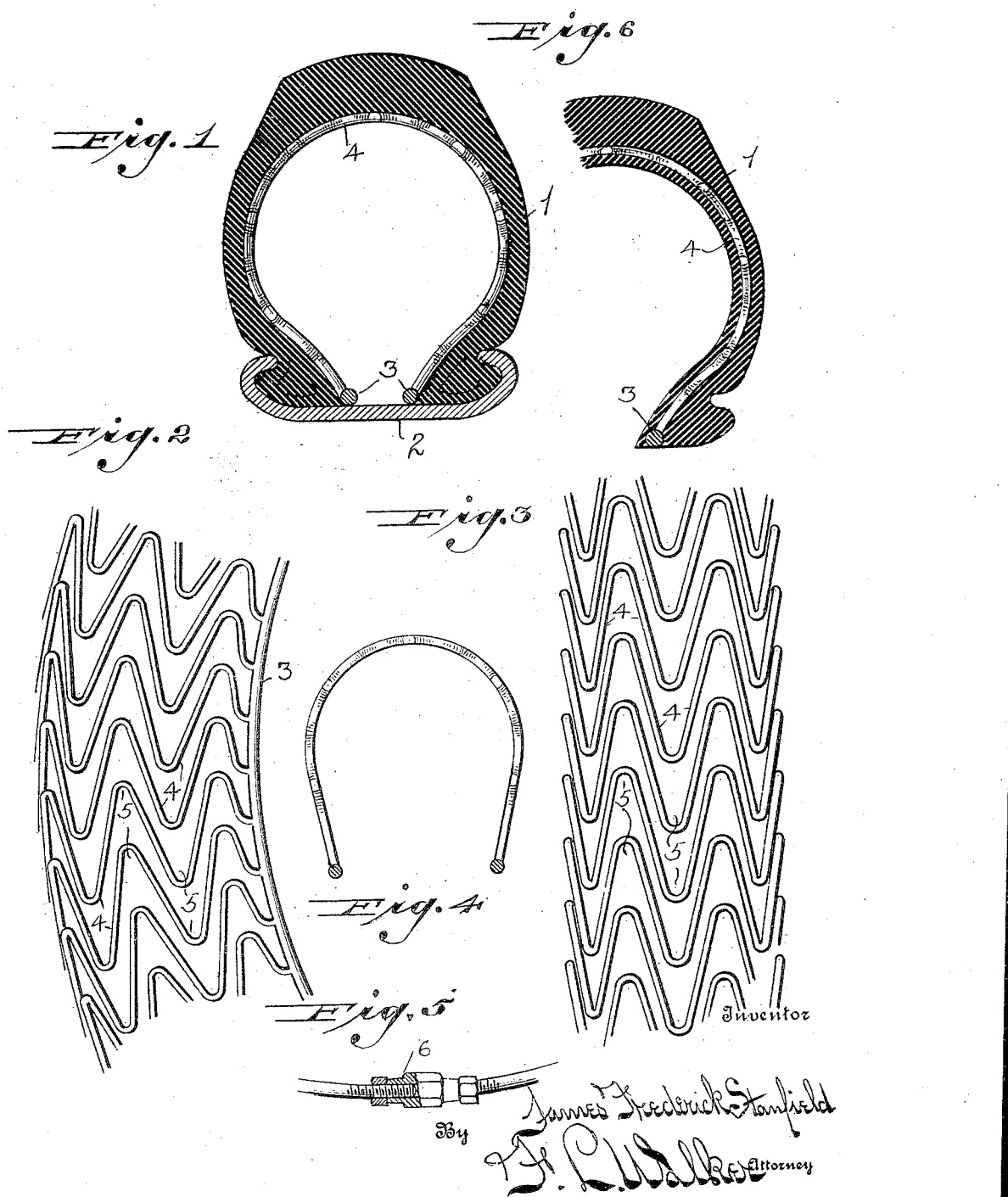

JAMES FREDERICK STANFIELD, OF TROY, OHIO.

RESILIENT FILLER.

1,420,158.  Specification of Letters Patent.  Patented June 20, 1922.

Application filed August 12, 1920. Serial No. 403,091.

*To all whom it may concern:*

Be it known that I, JAMES FREDERICK STANFIELD, a citizen of the United States, residing at Troy, in the county of Miami and State of Ohio, have invented certain new and useful Improvements in Resilient Fillers, of which the following is a specification.

My invention relates to vehicle tires and more particularly to a resilient liner or core to be inclosed in the casing or shoe of an ordinary pneumatic vehicle tire in lieu of the usual pneumatic air tube.

The object of the invention is to improve resilient vehicle tires for bicycles, motor vehicles, and like purposes, whereby they will not only be cheapened in construction, but will be more efficient in use, more reliable in operation, non-collapsible, and not subject to punctures and blow-outs, as are pneumatic tires.

I am aware that heretofore various types of resilient wire spring interliners or cores have been provided for tire casings. However, as usually constructed, such resilient interliners have been objectionable, due to the fact that the resistance to pressure or resiliency of the tire was not uniform because of unequal distribution of the supporting strands, and moreover, in many instances, such wire interliners involved intersecting resilient strands, which induced excessive friction, and wear at the point of intersection.

In the present instance, these objectionable features have been overcome, by providing transversely arranged tortuous or serpentine spring members, the bights of which enter within the corresponding bights of like resilient members on either side thereof, to afford a uniform structure having equal resistance or degree of resiliency throughout. The construction is such that no strand of the structure intersects or crosses another strand, and the pressure or resistance of the load is transferred uniformly from one resilient supporting strand to another.

With the above primary and other incidental objects in view as will more fully appear in the specification, the invention consists of the features of construction, the parts and combinations thereof, and the mode of operation or their equivalents, as hereinafter described and set forth in the claims.

Referring to the drawings, Fig. 1 is transverse sectional view of a resilient vehicle tire embodying the liner or core forming the subject matter of the invention. Fig. 2 is a side elevation of a portion of the core or interliner, removed from the tire casing. Fig. 3 is a similar view of the resilient wire core or interliner, viewed upon the periphery thereof. Fig. 4 is a transverse sectional view of the resilient core or interliner removed from the tube or casing and relieved of compression. Fig. 5 is a detail view of the connecting means and Fig. 6 is a modification.

Like parts are indicated by similar characters of reference throughout the several views.

Referring to the drawings, which disclose the preferred form of embodiment of the invention, 1 is a tire casing or shoe of the clencher type, such as is commonly employed in pneumatic tires. This shoe or casing is engaged in the usual manner in a tire rim 2, the inturned flanges of which engage the bead of the casing or shoe 1. Located within the shoe or casing, and forcibly distending the same, is an interliner or core of resilient wire construction. This interliner is of skeleton form, and comprises two spaced, circumferential bands 3—3, conforming substantially to the diameter of the rim 2, and bearing outwardly upon the shoe or casing 1, upon the interior of the base margin thereof. These circumferential bands may be of flexible character such as cables, but are shown in the drawings as wire hoops. The circumferential bands 3 are interconnected one with the other by arch shaped supporting ribs 4. The supporting ribs 4 are of resilient material, preferably wire, but may be of flat sheet metal, or strip construction. The ribs or tines 4 are of undulating or serpentine formation, having formed therein a succession of oppositely disposed bights 5. The bights or bends 5 of the resilient arch ribs or ties 4, are disposed substantially parallel with the adjacent portions of the tire shoe or casing. The ribs or ties 4 are arranged in spaced relation one with the other, and substantially parallel with the ribs or ties on either side thereof.

The bights or bends of the several ribs or transverse resilient ties, project laterally within the corresponding bights or bends of the adjacent ribs or ties without, however, intersecting or crossing such adjacent member. These bights being extended substantially parallel with the adjacent portions of the casing or shoe, exert a uniform outward pressure. During the rotation of the wheel the load or pressure is uniformly transferred from one supporting rib to another by means of these overlapping bights or bends. The pressure or load is nowhere sustained by any one supporting element. Because of the overlapping relation of the bights or bends, the pressure or load is progressively transferred from one arch shaped rib or tie, to the succeeding tie or rib by subjecting the successive member to a gradually increasing pressure before the preceding member is released. By this construction the resistance or tension of the skeleton frame is substantially uniform, and there are no spaces or areas between the supporting ties or rib having less sustaining power than other portions of the structure. By arranging the skeleton frame to embody this succession of re-entering bights or angles, without effecting contact or intersection of the rib or tie, not only is the resistance rendered more uniform, and even, but friction and wear at the point of intersection is entirely eliminated. The ends of the serpentine arcuate support are united with the circumferential bands 3 in any suitable manner, as by wrapping, soldering, brazing, welding or otherwise connecting the same.

The fabricated skeleton frame may be initially formed into a channel-shaped annulus, ready for insertion in the tire casing or shoe, but for economy of manufacture, it is preferably initially formed in extended lengths of flat ribbon-like formation. Such fabric may be produced by hand operations, or by specially devised machinery. It is cut in suitable lengths and subsequently formed to the desired channel shape, and annular contour by suitable forming or rolling operation.

To facilitate the engagement of the distending structure within a detachable tire casing, the ends of the skeleton frame are detachably connected one with the other, by the interengagement of the ends of the circumferential bands 3. The ends of these bands may be detachably engaged by any suitable means as by means of a coupling sleeve, screw threaded upon the ends of the bands 3 as shown at 6, or by other suitable inter-engaging means, the particular character of which forms no part of the present invention. The skeleton structure is of such length or peripheral extent as to completely fill the tire shoe or casing. It is of substantially semi-circular cross-sectional form, and is contacted and placed under lateral tension by the engagement of the tire beads within the rim 2.

While the skeleton structure has been shown in the drawings and heretofore described as an independent liner or insert for tire shoes or casings, it is obvious that it may be embodied in the casing or shoe at the time of manufacture, by being embedded and vulcanized in the material thereof as shown in Fig. 6. Such construction would not in any way change the essential characteristics of the invention, and is merely a variation of the mode of its application.

From the above description it will be apparent that there is thus provided a device of the character described, possessing the particular features above enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprise but one of several modes of putting the invention into effect, and the invention is therefore claimed in any of its forms or modifications within the legitimate and valid scope of the appended claims.

Having thus described my invention, I claim:—

1. The combination with a tire shoe or casing of a resilient reinforcement therefor comprising parallel circumferential bands and transversely arranged substantially parallel serpentine spring ties spaced one from the other connecting the bands one with the other.

2. The combination with a tire casing, of a resilient reinforcement therefor comprising a series of transversely arranged arch shaped wires having formed therein, a succession of oppositely disposed bights, with the bights of each member entering in spaced relation within the bights of the adjacent members, the ends of said arch shaped wires being interconnected one to another in predetermined spaced relation.

3. In a vehicle tire, a resilient skeleton frame comprising circumferential parallel marginal bands and transversely arranged arch shaped supporting members connecting said bands at pretermined spaced intervals, each arch having a laterally disposed bight formed therein projecting within the like bight of the succeeding arch, and a covering for said skeleton frame.

4. In a vehicle tire, a resilient skeleton frame comprising circumferential parallel marginal bands and transversely arranged arch shaped supporting members the opposite ends of which are connected to said bands in spaced relation each arch having formed therein a plurality of laterally disposed bights, each of said bights being extended within the like bight of an adjacent arch, and a covering for said frame.

In testimony whereof, I have hereunto set my hand this 6 day of July A. D. 1920.

JAMES FREDERICK STANFIELD.

Witnesses:
JOHN DINEEN,
GEORGE C. HELWIG.